Dec. 20, 1960  L. J. B. LA COSTE  2,964,948
FORCE MEASURING APPARATUS
Filed Sept. 30, 1954  5 Sheets-Sheet 3

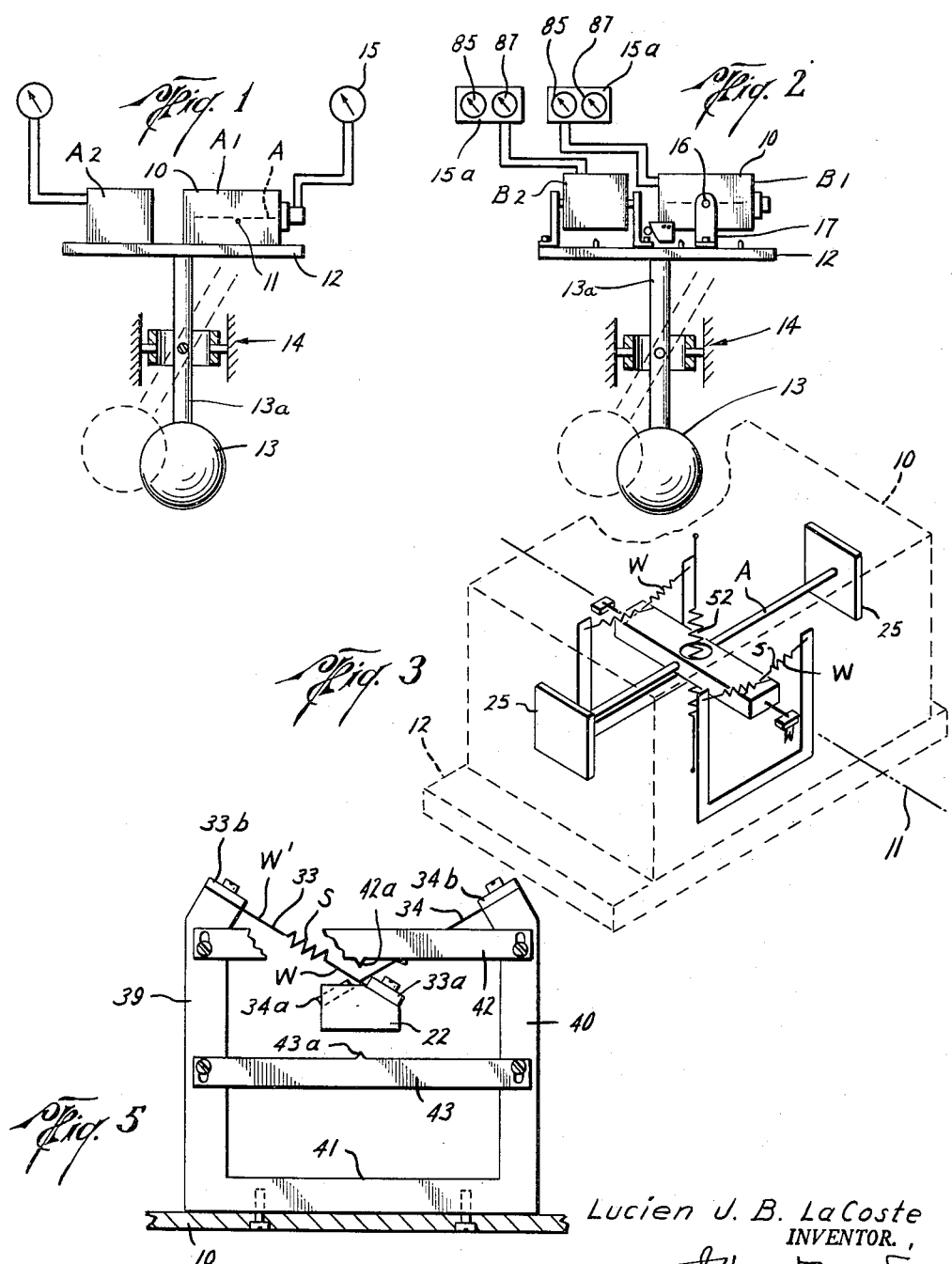

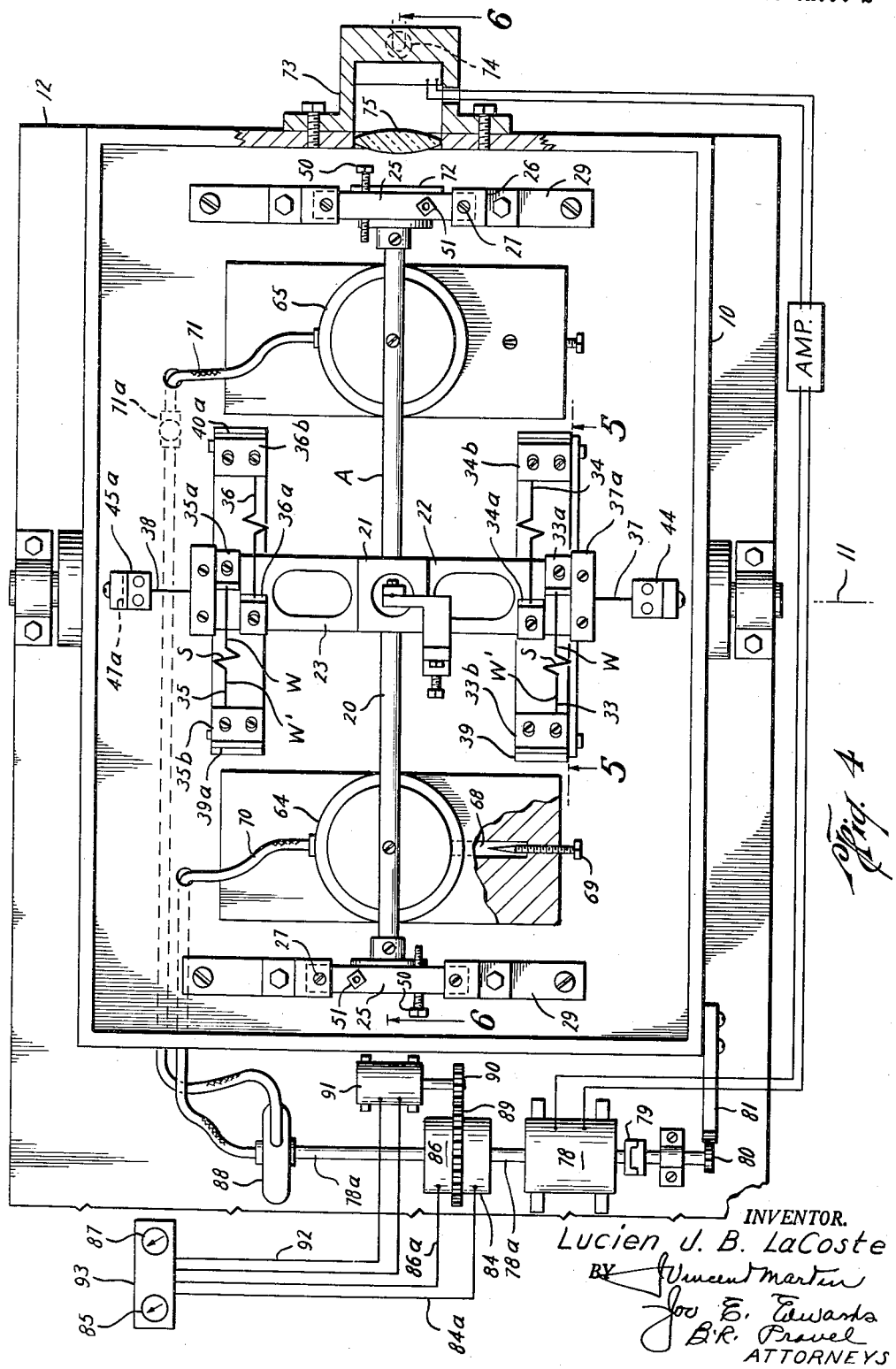

INVENTOR.
Lucien J. B. LaCoste
BY
 J. Vincent Martin
 Jor E. Edwards
 B. R. Pravel
 ATTORNEYS

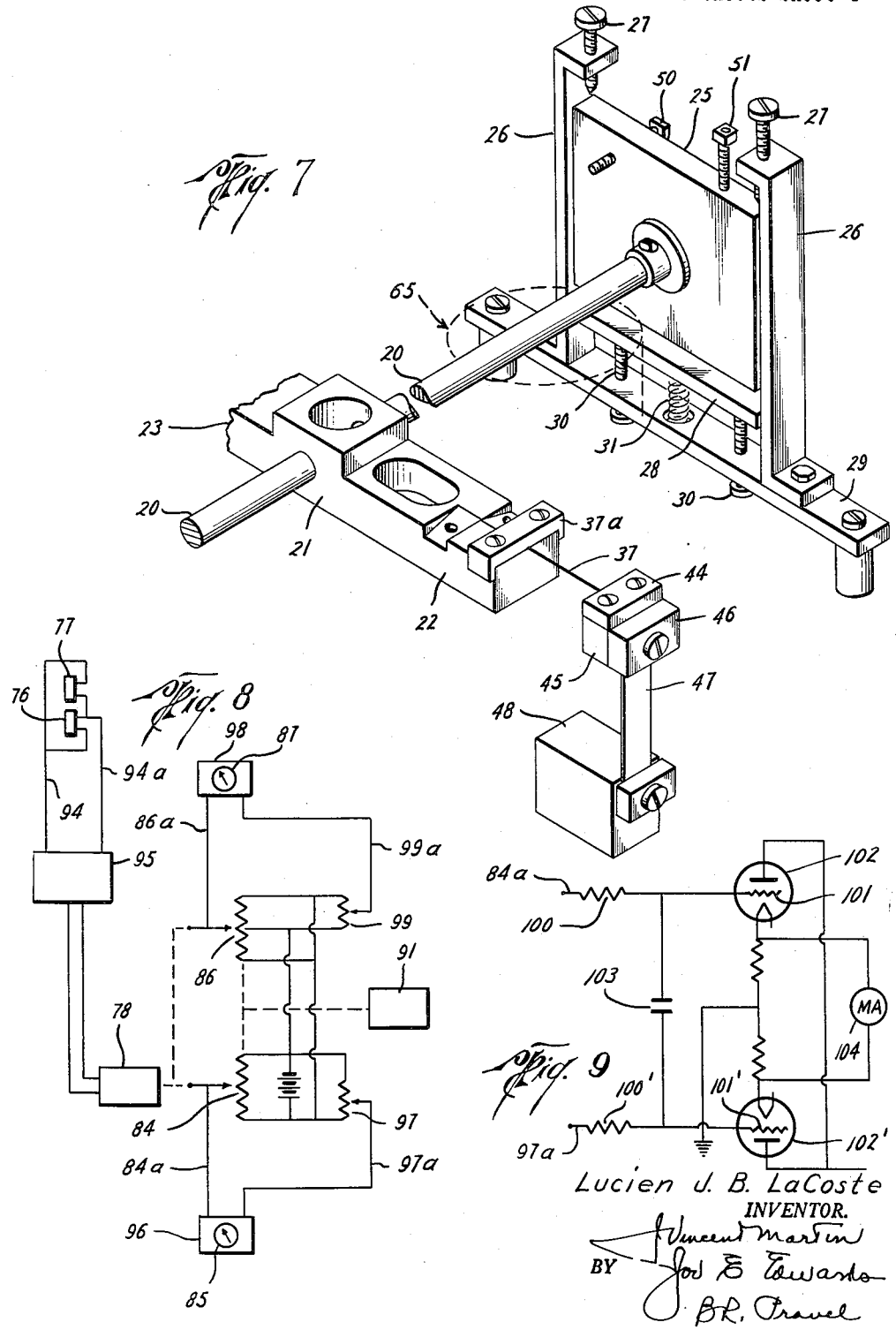

Dec. 20, 1960 L. J. B. LA COSTE 2,964,948
FORCE MEASURING APPARATUS
Filed Sept. 30, 1954 5 Sheets-Sheet 5
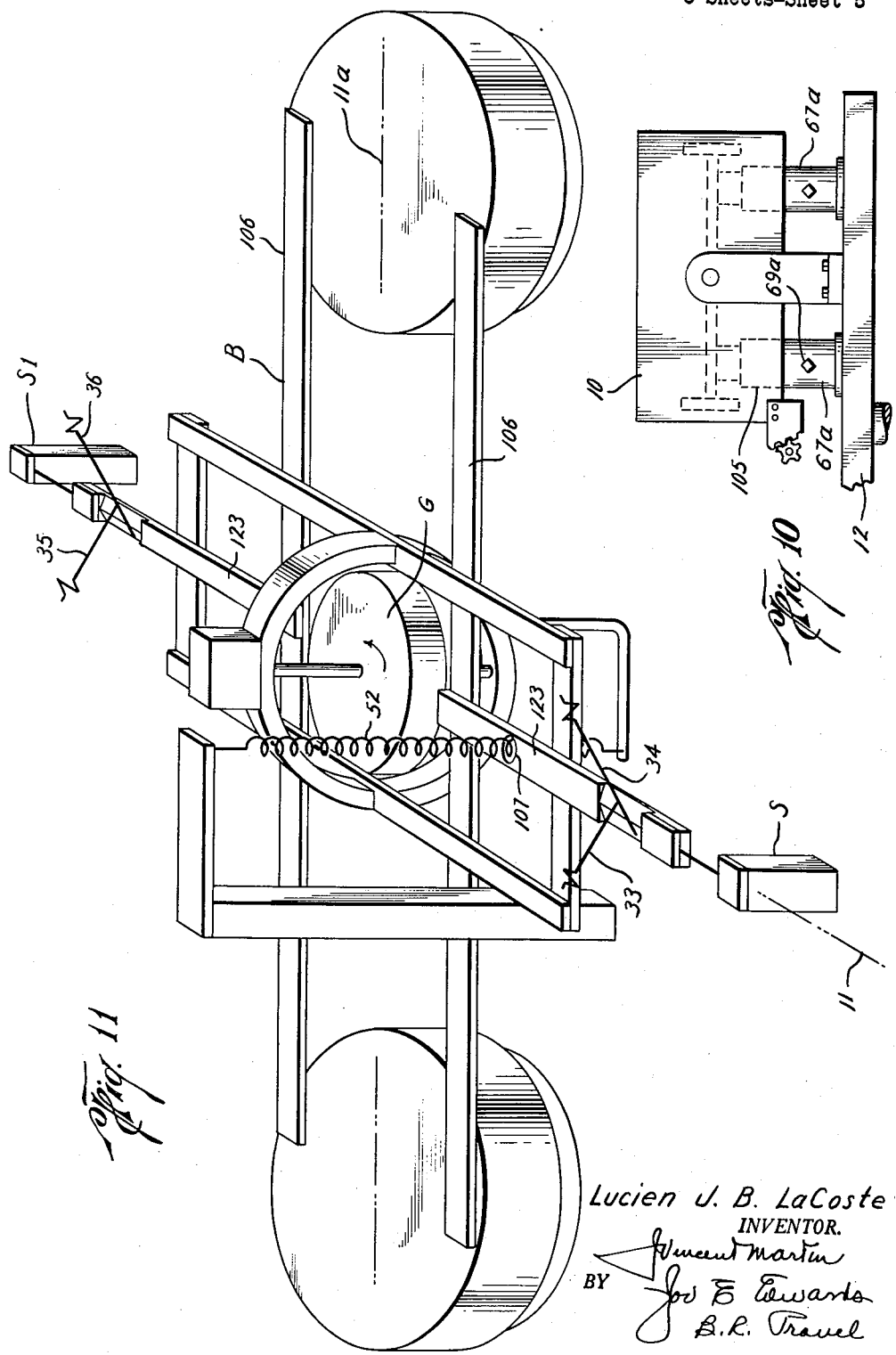
Lucien J. B. LaCoste
INVENTOR.
BY
ATTORNEYS

United States Patent Office

2,964,948
Patented Dec. 20, 1960

2,964,948

FORCE MEASURING APPARATUS

Lucien J. B. La Coste, Austin, Tex., assignor to La Coste & Romberg, Austin, Tex., a partnership Filed Sept. 30, 1954, Ser. No. 459,489

23 Claims. (Cl. 73—382)

This invention relates to new and useful improvements in force measuring apparatus.

There are many instances where it is desirable to provide a vertical reference, such as is provided by a vertical gyro, for use on ships, submarine or aircraft. It is also advantageous in certain operations to provide an apparatus which will accurately measure horizontal accelerations or forces developed by the movement of a carrier, such as a submarine; for example, in gravity meter work, where the gravity meter instrument is mounted on a moving carrier, the accuracy of the final measurement or determination is dependent upon obtaining an accurate measurement of the horizontal accelerations or forces so that said accelerations and forces may be considered and allowed for.

It is, therefore, one object of the invention to provide an improved apparatus including an element which functions as a vertical reference in the manner of a vertical gyro but which has certain advantages over such gyro in that it has no high speed moving parts and yet has greater accuracy.

Another object of the invention is to provide an apparatus wherein the element which may function as a vertical reference is capable of combination with other equipment to produce an extremely accurate means for measuring the horizontal accelerations or forces developed by the moving carrier upon which the apparatus is mounted.

An important object of the invention is to provide an apparatus, of the character described, including a beam or inertia member having an improved suspension or mounting which is substantially frictionless and which supports the beam within its housing in a manner to give the beam an extremely long period of oscillation, thereby making the beam insensitive to acceleration forces of periods shorter than the beam period and consequently making the position of the beam dependent almost solely upon the direction of the earth's gravitational force.

A particular object is to provide a balanced beam or inertia member which is suspended by flexible tension elements which permit a rotation of the beam on a horizontal axis and which apply a restoring torque to the beam upon an oscillation of the beam around said axis; the apparatus also including a resilient means connected with the beam in a manner to counterbalance the restoring torque applied by the tension means, whereby the beam is given an extremely long period of oscillation, thus making it insensitive to shorter period acceleration forces and making it responsive almost entirely to the direction of the earth's gravitational force.

Still another object is to provide damping means in association with the suspended beam to prevent the beam from vibrating at its natural frequency and to dissipate the initial momentum of the beam, whereby the transients are caused to dissipate rapidly.

A further object is to provide a balanced beam or inertia member in which the sum of all torques exerted on the beam by its suspending means is substantially equal to zero so that the restoring torque on said beam will be due to gravitational and acceleration forces acting at the center of gravity of the beam; this arrangement making it possible to control the period of oscillation of the beam by raising and lowering the center of gravity of said beam with respect to its axis of rotation without making the apparatus sensitive to tilt.

Still another object is to provide a balanced beam which is flexibly mounted with respect to oscillation about a horizontal axis but is fairly rigidly mounted with respect to horizontal and vertical translation; the mounting also providing for an extremely long period of oscillation which increases the accuracy of any measurements made with relation to said beam.

A particular object is to provide an apparatus having a balanced beam suspended within a housing, with a period of oscillation long enough to make it insensitive to the acceleration forces ordinarily encountered and thereby responsive substantially only to the direction of the earth's gravitational force, and also to provide means for accurately measuring the angular relationship between said housing and beam, whereby said beam functions as a reference direction.

Another object is to provide an apparatus, of the character described, wherein a balanced beam has a period long enough to make the beam responsive almost entirely to the direction of the earth's gravitational force, and which apparatus may be combined with a pendulum or pendulum-mounted instrument and may be employed to accurately indicate and measure the horizontal forces or accelerations acting on the pendulum.

Still another object is to provide a force measuring apparatus wherein the balanced beam has a sufficiently long period that it is responsive substantially only to the direction of the earth's gravitational force or to the vertical, and wherein the beam is utilized to control the position of its housing whereby the housing becomes a vertical reference; the apparatus also including means for measuring the angular displacement of a pendulum or pendulum-mounted instrument with respect to the said housing, or with respect to the vertical.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a schematic view of a simple form of a measuring apparatus, constructed in accordance with the invention;

Figure 2 is a view similar to Figure 1 showing the preferred form of the invention;

Figure 3 is a schematic, isometric view illustrating the balanced beam or inertia member of the simple form of the invention illustrated in Figure 1;

Figure 4 is a plan view of the preferred form with the top of the housing removed to show the interior;

Figure 5 is a detailed view of the mounting for the suspension elements, taken on the line 5—5 of Figure 4;

Figure 7 is an enlarged isometric view of one end of the beam;

Figure 8 is a diagram of the electrical circuit;

Figure 9 is a diagram of the electrical circuit of each averager;

Figure 10 is an elevation of a modified form of the invention; and

Figure 11 is an isometric view showing a vertical gyro mounted on the beam.

Figure 6:
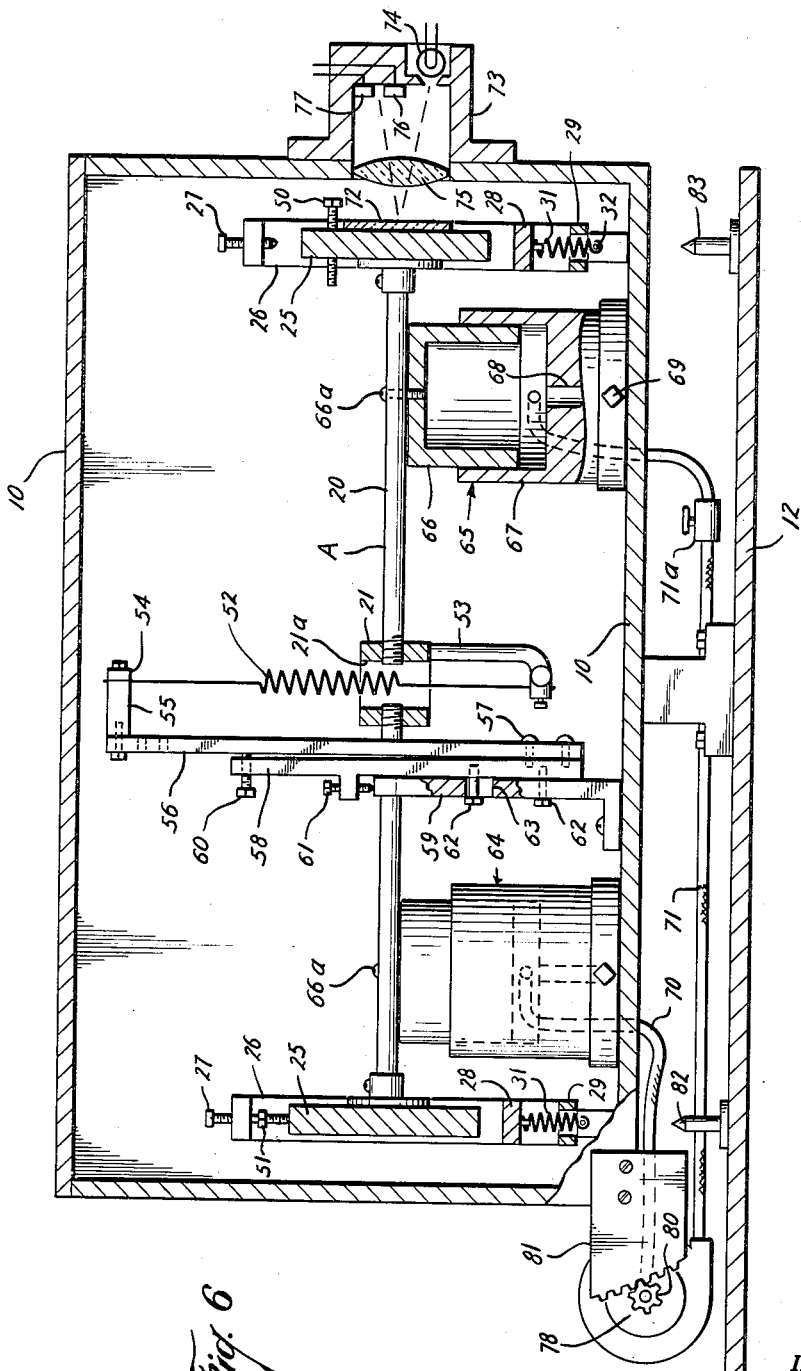
Figure 6 is a longitudinal, sectional view, taken on the line 6—6 of Figure 4.

In the drawings the letter A designates an approximately balanced beam or inertia member which is located within a housing 10. The basis of the invention is illustrated schematically in Fig. 3 and as shown in such figure, the beam A is suspended or supported within the housing for rotation about the horizontal axis 11. As will be explained, the mounting of the beam is such that the beam is very flexibly suspended with respect to oscillations about the axis 11 but is fairly rigidly suspended with respect to translations or movements in horizontal or vertical directions. The suspension also provides for a relatively long period of oscillation of the beam.

The particular mounting or suspension of the beam is substantially frictionless and provides an arrangement which allows an extremely long period of oscillation of the beam to be attained. This long period of oscillation makes the beam very insensitive to the shorter period forces caused by the accelerations generally encountered in ships or airplanes. The position of the beam is therefore determined almost completely by the direction of the earth's gravitational force and therefore it can be used for obtaining a vertical reference. As will hereinafter appear, the particular construction makes the unit applicable for combination with additional equipment to accurately measure horizontal accelerations or forces.

Reference to Fig. 1 illustrates one application of the invention when used for the measurement of horizontal acceleration or force. The housing 10 within which beam A is suspended may be mounted upon a base plate 12 and the upper end of the shaft 13a of the pendulum 13 is secured to the under side of said plate. The pendulum is supported for universal swinging movement in the usual gimbal ring mounting and obviously, when the pendulum is moved due to a horizontal acceleration or force, the angle of the pendulum shaft 13a is changed with respect to vertical. Since the upper end of the shaft is secured to the base plate, the swinging of the pendulum results in tilting or inclining the base plate 12 with relation to a horizontal plane and the angle of inclination of the base plate is a measure of the amount of movement of the pendulum. The beam A, however, because of its long period of oscillation responds primarily to the direction of the gravitational force whereby said beam maintains its position in a horizontal plane. It is thus apparent that the beam A becomes a reference direction and by measuring the angle between the inclined base plate and the housing 10 attached thereto with respect to the beam A, an indication which is representative of the angle of the pendulum relative to vertical, may be obtained. Since the angle of the pendulum from vertical is indicative of the horizontal acceleration or force which is acting upon the pendulum, it is evident that a measurement of the angle between beam A and housing 10 is actually a measurement of said horizontal acceleration or force. Any suitable means, one of which will be hereinafter described, may be employed to visibly indicate the angle between beam A and housing 10 on a visible indicator 15.

It is noted that the beam A oscillates only about the single axis 11 and therefore one unit which includes the housing and its contained parts provides a measurement of horizontal forces only in a single plane. In order to measure the horizontal forces in a plane at right angles to the first unit which is designated as A1 in Fig. 1, a second or duplicate unit A2 is mounted on the base plate 12 and is located with the axis about which the beam oscillates at substantially a right angle to the axis 11 of the first unit A1. Although a pendulum 13 is disclosed as controlling the movement of the base plate 12 and housing 10 of the units A1 and A2, it is apparent that a gravity meter could be substituted for the weight portion of the pendulum and in such instance the units would measure the horizontal forces or acceleration acting upon the gravity meter.

It is pointed out that the unit schematically illustrated in Figs. 1 and 3 is a simple form of the invention. In this form, the housing 10 is mounted directly upon the base plate 12 which means that a measurement of the angle between housing 10 and beam A is made. Although this arrangement is satisfactory for the purpose, it has been found preferable to mount the housing 10 in the manner shown in Fig. 2. In this form of the invention, the housing 10 of a unit B1 is pivotally supported at 16 on suitable brackets 17 which are secured to the base plate 12. With this construction, the housing 10 may undergo a swinging movement on the horizontal axis of pivot pins 16, such swinging movement being with respect to the base plate 12. In this form of the invention, a followup mechanism, which will be later described, is employed to cause the housing 10 to follow the position of the beam A. In other words, if the housing 10 tends to swing or tilt independently of the beam A which is suspended therein, the followup mechanism maintains the housing in the same relative position with respect to the beam at all times. It is thus apparent that since the beam A, being responsive almost solely to the direction of the gravitational force, is maintained in a substantially constant direction, the housing too is maintained in such direction. Thus the housing 10 actually becomes a reference direction and it is possible to measure the angle between the housing 10 and the base plate 12 and to indicate the same on a suitable indicator 15a to thereby indicate the horizontal accelerations or forces acting upon the pendulum 13. Experience has shown that more accurate measurements may be made by mounting the housing 10 of each unit in the manner shown in Fig. 2. As in the first form a second unit B2, which has an axis of rotation disposed at a right angle to the axis of rotation of unit B1, is provided and mounted upon the base plate 12.

It should be pointed out that a slight modification of Fig. 2 can be used to provide a stabilized platform. To accomplish this the two units B1 and B2 are mounted on a single plate rather than upon pivots 16 and the tilt of the single plate is controlled in two directions as before by the same two followup mechanisms.

The followup mechanisms will then act as before to hold both units B1 and B2 in fixed directions in space, thereby providing a stabilized platform.

The details of construction and the particular mounting and suspension of the beam A within the housing are illustrated in Figs. 4 to 7. As shown in these figures, the beam A comprises a longitudinally extending rod or bar 20 which is illustrated as constructed of two pieces connected by a central cross-member 21. The cross-member 21 is disposed at a right angle to the longitudinal axis of the rod 20 and its ends comprise transversely extending arms 22 and 23. Each end of the rod 20 carries a balancing weight 25, and since these weights and their associated parts are identical in construction a description of one will suffice.

As shown in Fig. 7, each weight 25 is secured to the outer end of the rod 20 and is movable between upstanding angular bars 26. The upper end of each bar 26 is bent inwardly to overlie the weight and a stop-screw 27 is adjustably secured in the offset portion. The screws 27 function to limit upward movement of the weight.

Downward movement of each weight is limited by a stop-bar 28 which is located below the weight and which extends between the uprights 26. A supporting element 29 which is secured to the bottom of the housing 10 has stop-screws 30 threaded therethrough and said screws abut the under side of the stop-bar. A coil spring 31 (Fig. 6) which is attached to the underside of the stop-bar and to a cross-pin 32 on the support element 29 urges the stop-bar downwardly into contact with the screws 30; by adjusting the screws the position of the stop-bar may be controlled to limit downward movement of the weight. It is noted that the upper surface of the stop-bar 28 and the lower surface of each weight is substantially flat and these flat surfaces are adapted to contact each other to limit movement of one relative to the other; by providing such flat surfaces tendency of the weight to rebound from the stop-bar is reduced.

The important feature of the present invention resides in the manner of mounting or supporting the beam A for movement about the axis 11. This mounting includes (Fig. 4) a plurality of flexible tension elements 33, 34, 35 and 36 and additional elements 37 and 38. The flexible elements 33 and 34 are secured to the outer end of the arm 22 formed on cross-member 21, while the elements 35 and 36 are secured to the outer end of the arm 23 formed on said cross-member. Each element 33, 34, 35 and 36 includes wires W and W' connected by a spring S. The end of the wire W is fastened by a suitable clamp 33a to the arm 22, while the wire W' is fastened by a suitable clamp 33b to an upright post 39 which is attached to the housing. Similarly, the flexible element 34 has one end clamped by clamp 34a to arm 22, while a clamp 34b fastens the same to a second upright post 40. The connections of the flexible elements 33 and 34 are clearly shown in Fig. 5 and as illustrated the upright posts 39 and 40 are connected by a base 41 which is secured to the housing 10. For limiting the extent of movement of the outer end of the arm 22 of cross-member 21, limiting bars 42 and 43 are adjustably secured to posts 40 and are disposel above and below the arm 22. The end of the arm is limited in its vertical movement between points 42a and 43a on the respective limiting bars.

The opposite arm 23 of the cross-member is suspended in a similar manner by the flexible elements 35 and 36. Element 35 is clamped at 35a to the arm 23 and is clamped to an upright post 39a by clamp 35b. Element 36 is clamped at 36a to arm 23 and to an upright post 40a by clamp 36b.

The flexible elements 33, 34, 35 and 36 are all preferably clamped to the beam at points in a straight line which approximately passes through the center of gravity of the beam A, whereby the beam may oscillate about the axis 11. Obviously, it would be possible to provide an axis of oscillation for the beam by interchanging the roles of the beam and the housing. In this case the flexible elements 33, 34, 35 and 36 would not be clamped to the beam in a straight line but would be clamped to members fixed to the housing at points substantially in a straight line passing through the center of gravity of the beam.

The outer end of the arm 22 is connected by a clamp 37a with the flexible element or wire 37 (Figs. 4 and 7). The other end of wire 37 is suitably secured by clamp 44 to a block 45, and this block is fastened by clamp 46 to the upper end of a flat spring 47 and it is evident that the wire 37 and the flat spring, together with their associate parts, function as a flexible tension element to resist horizontal translations of the beam. The lower end of the flat spring 47 is fastened to a supporting member 48 which is secured to the housing.

The opposite arm 23 has its outer end connected with the flexible wire element 38 which element is secured to a block 45a having the upper end of a flat spring 47a secured thereto. The spring 47a is mounted in the same manner as spring 47 and together with the wire 38 forms a flexible tension element. The flat springs 47 and 47a, being connected to the ends of the cross-member through the flexible elements 37 and 38 resist movement of the beam in lateral directions and in cooperation with the flexible tension elements 33, 34, 35 and 36, they function to suspend the beam with substantial rigidity so far as translations or movements of the beam are concerned in any direction other than about the axis 11. It is preferable that the wires 37 and 38 connect with the arms 22 and 23 at a point in alignment with the points of attachment of the elements 33 to 36 which is in the axis 11 about which the beam oscillates.

By adjusting the center of gravity of the beam A and its connected parts so that said center of gravity is approximately in the axis 11 on which the ends of the flexible elements 33 to 36 are clamped, a long period of oscillation can be obtained. Such long period of oscillation is extremely desirable and in the present invention, this period is determined by the restoring forces in the flexible tension elements 33 to 38 and by the position of the center of gravity of the beam 1. The weights 25 at the ends of the beam are employed to properly balance the beam in its suspended position. To obtain infinitely small adjustments in balance and in the position of the center of gravity, each weight 25 is provided with a horizontally movable adjusting nut 50 and a vertically movable adjusting nut 51, these nuts being mounted upon screws which are mounted in the weights. Adjustment of nuts 50 adjusts the balance while adjustment of nuts 51 varies the center of gravity vertically.

It is possible to counterbalance to an appreciable extent the restoring torque of the flexible tension elements 33 to 36 by raising the center of gravity of the beam A above the axis 11 of rotation. However, when this is done the beam becomes extremely sensitive to any tilting of the housing 10, the reason being that any tilt of the housing varies the forces due to the restoring torque in the flexible tension elements but does not at the same time vary the gravitational force exerted at the center of gravity of the beam. This extreme sensitivity to tilt is most objectionable if the unit is to be employed as a vertical reference or for the measurement of horizontal acceleration.

Since it is not practicable to counterbalance the restoring torque of the flexible tension elements by raising the center of gravity, this counterbalance is effected by a labilizing spring 52 (Fig. 6). The lower end of this spring is connected at a point below the axis 11 with a depending bracket 53 which has its lower end offset to align it with the center of the beam A. The upper end of the spring is secured by a clamp 54 to a bracket 55 which is, in turn, attached to an upright supporting bar 56. The bar 56 has its lower end secured by screws 57 to a second bar 58 and this latter bar is adjustably mounted on a support member 59 which is fastened to the base of the housing 10. An adjusting screw 60, which is threaded through the upper end of bar 58 engages the support 56 and by proper adjustment may impart limited lateral movement to the bar 56 and thereby properly locate the upper end of the labilizing spring with respect to the center of the beam. Vertical adjustment of the block 55 and support bar 56 to vary the tension of labilizing spring 52 is effected by an adjusting screw 61 mounted in bar 58 and engaging the support 59; the vertical adjustment is held to lock the parts in adjusted position by headed bolts 62 which extend through slots 63 in the support and which have threaded engagement with the bar 58.

The mounting of the labilizing spring 52 is preferably such that the spring is located to pass through the axis 11 rotation of the beam A when the net restoring torques exerted by the flexible tension elements 33 to 38 is zero, said spring extending through a central opening 21a formed at the center of the beam. Since one end of the labilizing spring is attached through its supporting members to the housing with the other end secured to the beam through the bracket 53 at a point spaced below the axis 11 of rotation, said labilizing spring produces a torque on the beam A which opposes the restoring torque of the flexible suspending elements 33 to 36. Obviously, the strength of the labilizing spring 52 will control the magnitude of the torque produced by said spring and it is preferable to adjust the spring strength so that the labilizing torque exactly counterbalances the restoring torque in the flexible tension elements 33 to 38. With such an adjustment of the labilizing spring 52, the sum of all torques due to elastic forces upon the beam A is zero, or substantially zero, and the restoring torque on the beam A will then be due to gravitational and acceleration forces acting at the center of gravity of the beam; the period of oscillation of the beam can therefore be controlled by raising or lowering its center of gravity with respect to the axis 11 of rotation.

The adjustment of the center of gravity of the beam with respect to its axis of rotation may be simply accomplished by changing the positions of the vertically movable adjustable nuts 50 which are mounted on the weight members 25 secured to the end of the beam. Of course, as has been noted, final balancing of the beam is accomplished by adjustment of the nuts 51 which are movable in a lateral plane with respect to the weight members 25. Actual experience has shown that by proper adjustment of the labilizing spring, together with adjustment of the center of gravity with respect to axis of rotation and proper balancing of the beam, oscillation periods of more than one minute can be obtained.

From the foregoing it will be seen that the beam A is suspended for rotation about the axis 11 by means of the flexible tension elements which are so disposed that the beam is more or less freely movable about the axis 11, while being fairly rigidly suspended so far as translations are concerned. The mounting is substantially frictionless since no bearings of any kind are employed. Any oscillation of the beam about its axis will cause certain of the suspending elements to transmit a restoring torque to the beam but the labilizing spring functions to counterbalance such restoring torque, whereby the sum of all torques acting upon the beam is substantially zero. By properly adjusting the center of gravity of the beam its period of oscillation can be made long compared to the forces due to accelerations ordinarily encountered in practice with respect to carriers such as ships and airplanes; the beam will therefore be very insensitive to these acceleration forces and will be responsive almost entirely to the direction of the earth's gravitational force.

In actual use it is desirable to damp the beam so that it will not vibrate at its natural frequency and for this purpose a pair of dampers 64 and 65 (Fig. 4) are provided. The dampers are located on opposite sides of the axis 11 of rotation and are identical in construction, each including a piston 66 which is mounted on the beam A and which is movable within a cylinder 67, having its lower end secured to the base of the housing (Fig. 6). The interior of each cylinder has an air vent passage 68 extending therefrom, and an adjustable valve element 69 which is movable relative to the outlet of said passage and which controls the escape area of the passage. The piston 66 has a relatively close fit within the cylinder, and is secured to the beam rod 20 by any suitable means such as screw 66c. The closeness of the fit of each piston within its cylinder provides damping of translations in a horizontal direction. A flexible air conduit 70 is connected with the cylinder of the damper 64, while a similar flexible conduit 71 having a manually adjustable valve 71a therein, has connection with the damper 65. As will be explained, air is either applied to or withdrawn from the interior of the cylinders of the dampers in accordance with the direction of movement of the beam A to perform the desired damping action.

In the operation, let it be assumed that the righthand end of base 12 is lowered. The inertia of beam A will tend to make it remain fixed in space, which will cause its righthand end to be raised with respect to the base and with respect to the housing. In the preferred form (Fig. 2) where the housing is pivotally mounted on the base plate and follows the beam, the follow-up mechanism would act upon the housing to cause said housing to move upwardly at its righthand end in Fig. 6, thus preventing substantially all relative motion between the beam and the housing.

If no air is pumped into or out of either damper 64 or 65, there will be no damping forces exerted on the beam because there is no relative motion between the beam and housing. In this case any oscillation the beam might have will not die out. To avoid this difficulty air is directed into damper 64 and withdrawn from damper 65 at a rate substantially proportional to the relative angular velocity between the base 12 and the beam A (and housing 10). A damping force is thereby applied to the beam relative to the base. The damping is adjusted so as to quickly damp out any beam oscillations at the natural frequency of the beam. It is pointed out that where the housing 10 is mounted directly on the base plate 12, as in Fig. 1, the use of the flexible conduits may be eliminated. In such case, the damping would be accomplished by the pistons moving within the cylinders as permitted by adjustment of the valves 69. Thus in the simple form of the invention as illustrated in Fig. 1 the housing 10 actually moves independently with respect to the beam. However, in the second form, the housing is made to follow the beam and substantially remains in the same relative position with respect thereto at all times and thus the auxiliary means of introducing or withdrawing air from the dampers has been found necessary to properly dampen the movements.

In order to accomplish a followup movement of the housing with respect to the beam A in the preferred form of the invention (Figs. 4 to 7) and also to measure the angle between the position of the housing and the base plate 12, one of the weights 25 has a mirror element 72 secured to its outer surface (Fig. 6). An optical system is mounted within a casing 73 attached to that end of the housing 10 adjacent the mirror and includes an electric lamp 74 which projects a light beam upon the mirror which reflects the projected light toward a pair of light sensitive or photoelectric cells 76 and 77. When the beam A and housing 10 are in alignment, the reflected light is substantially between the photoelectric cells 76 and 77 and each cell receives either no light or an equal amount of light; however, any variation of the beam A with respect to the housing from such position will cause one or the other of the cells 76 and 77 to receive a greater amount of the reflected light, whereby the output of that cell is varied. The output of the photoelectric cells is connected in a suitable electric circuit which controls the operation of a servo motor 78 (Fig. 4). This motor has its shaft connected through a friction clutch 79 with a gear 80 whereby said gear is driven through the clutch by said motor. The gear is in mesh with an arcuate gear segment 81 secured to a corner of housing 10 and when the motor is operated in one direction or the other by the photoelectric cells 76 and 77, the housing 10 is caused to tilt in accordance with the particular cell receiving the light rays. The arrangement is such that the motor is actuated to cause the housing to follow the beam and thereby remain in desired alignment therewith. Movement of the housing by the motor is limited by upstanding stops 82 and 83 (Fig. 6) and the friction clutch 79 permits the motor 78 to continue operating even though movement of the housing has been halted.

In order to indicate the angle between the base plate and vertical, a linear potentiometer 84 is mounted on the motor shaft 78a of the motor 78. The output of this potentiometer is directed through lead 84a to a suitable electric circuit, which will be hereinafter described, to operate a remotely located indicator 85 in the indicating device 15a (Fig. 2); this indication is approximately proportional to the horizontal acceleration in the direction concerned. For some purposes, such as in measuring gravity, it is desirable to determine how much the aforesaid horizontal acceleration increases the apparent value of gravity as measured on the ship or plane undergoing the acceleration. A calculation shows that the apparent increase in gravity is approximately proportional to the square of the horizontal acceleration. In order to obtain an indication of the square of the horizontal acceleration, a second potentiometer 86, which is referred to as a parabolic potentiometer is provided. This potentiometer gives a voltage proportional to the square of its rotation. The parabolic potentiometer 86 is fixed to the servo motor shaft 78a and the output of this potentiometer is carried through a lead 86a to a remote indicator 87 which is also located in indicating device 15a (Fig. 2) and which provides an indication proportional to the apparent increase in gravity acceleration.

The withdrawal and application of air to the dampers 64 and 65 through the flexible conduits 70 and 71 is controlled by a blower or pump 88 (Fig. 4) which is also driven by the servo motor shaft 78a. It will be evident that when the servo motor operates to cause the housing to follow the beam, as has been described, the pump will be operated to direct or remove air from the desired damper. If the housing engages one of its stops 82 or 83 the clutch 79 will permit the motor to continue to operate the pump so that the damping action continues even after the housing has come to rest. This prevents the beam from hitting and bouncing off the stops 27 and 28 in the housing, which greatly speeds up the damping out of transients which are particularly troublesome when the servo is first turned on.

In employing the parabolic potentiometer 86 which measures the apparent increase in gravity which increase is due to horizontal accelerations, this potentiometer must be properly set so that it will read zero when the pendulum 13 is vertical, that is, when there is no horizontal acceleration. In order to accomplish the setting of the potentiometer by remote control at any time, the potentiometer 86, as well as the linear potentiometer 84 have their housings secured to a gear 89. This gear is engaged with a gear 90 which is driven by a control motor 91 which has electrical connection through leads 92 with the indicating device 15a in which the indicators 85 and 87 are mounted. The potentiometers 84 and 86 are fixed to the gear 89 in proper relationship and at the proper angles so that the output of both potentiometers is zero at the same time; with such arrangement, one potentiometer will be correct if the other potentiometer is correct.

If the pendulum 13 is not functioning but is at rest in a vertical position, the output of either potentiometer may be employed as a reference to operate the motor 91 and thereby adjust said potentiometer. However, if the pendulum is swinging due to horizontal acceleration, then motor 91 is employed to adjust the average position of the linear potentiometer 84 to zero and this adjustment will automatically fix the parabolic potentiometer in the correct position.

Although various electrical systems may be employed to accomplish the result, one type of electrical circuit which has been found satisfactory is illustrated in Fig. 8. The photoelectric cells 76 and 77 are inter-connected and leads 94 and 94a extend to the servo motor 78. A suitable amplifier which may be a "Minneapolis Honeywell" servo-amplifier is interposed between the cells and the motor. As explained, the motor 78 drives both the linear potentiometer 84 and the parabolic potentiometer 86, this driving connection being indicated by dash lines in Fig. 8. The electrical output of the linear potentiometer and a comparison voltage from the fixed potentiometer 97 are fed to an averager 96 through the leads 84a and 97a, respectively. Similarly, the electrical output of the parabolic potentiometer 86 and a comparison voltage from the fixed potentiometer 99 are fed to an averager 98 through the leads 86a and 99a, respectively. The motor 91 is mechanically connected with the housing of potentiometers 84 and 86 to properly zero said potentiometers.

A simple type averaging circuit is illustrated in Fig. 9, such circuit being incorporated within the averagers 96 and 98. As shown, the two inputs identified as 84a and 97a are fed through resistors 100 and 100' to the grids 101 and 101' of triode tubes 102 and 102'. A condenser 103 is connected between the grids. The two triode tubes 102 and 102' are connected as cathode followers and their outputs drive a milliammeter indicated at 104 in Fig. 9. The milliammeter is, of course, the indicator, either 85 or 87. Although the electrical circuits illustrated in Figs. 8 and 9 have been found satisfactory, other types of circuits may be employed.

In summarizing the operation of the preferred form of the invention which is illustrated in Fig. 2 and Figs. 4 to 7, it is noted that the housing 10 is pivotally mounted on the pins 16 in the brackets 17 so that said housing may undergo a tilting movement with respect to the base 12 to which the pendulum 13 is attached. The beam A is suspended within the housing by means of the flexible tension elements 33 to 38 and the labilizing spring 52 is adjusted to substantially balance out the restoring torque of the flexible elements 33 to 36. The center of gravity of the beam is properly adjusted to give a very long period of oscillation to the beam, thus making it insensitive to the shorter period forces due to the accelerations ordinarily encountered in ships or planes. This adjustment makes the beam responsive almost entirely to the direction of the earth's gravitational force. The servo tilts the housing so that there is practically no relative motion between the beam and housing and in addition drives a pump which provides damping by directing air into or withdrawing air from the dampers. One of the principal advantages of the servo drive results from the fact that there is practically no relative motion between the beam and housing. This insures that the flexible tension elements 33 to 38 and the labilizing spring 52 undergo practically no change in deformation during operation. This feature makes possible more accurate adjustments and also practically eliminates any effects due to elastic hysteresis. As a result periods of over four (4) minutes can be obtained with the preferred form of the invention.

Assuming that horizontal accelerations are to be measured, the pendulum 13 will swing at an angle with respect to vertical, which means that the base plate 12 will be tilted or disposed at an angle with respect to the beam A and to the housing. Because of its long period of oscillation, the beam will maintain its position as controlled by the direction of gravitational force and through the servo motor 78, the housing will follow the beam. The angular difference between the base plate 12 on one hand and the housing 10 and beam A on the other hand will be measured and indicated by the indicator 85 which is controlled by the linear potentiometer 84. Proper damping of the movement is accomplished by the dampers 64 and 65 from which air is removed or applied by means of the pump 88, which pump is actuated by the servo motor 78. Because the long period of oscillation of the beam makes it responsive only to gravitational forces, said beam will be retained in proper position with respect to such forces at all times. Through the servo motor, the housing is also maintained in such position and in effect functions as a vertical reference. It is actually a very accurate reference from which any desired measurement may be made.

In the preferred form of the invention, the housing is caused to follow the beam and to act as a reference direction. However, in some instances it may be desirable to employ the beam alone as such reference direction, and the simple form of the invention shown in Fig. 1 would operate in this manner. In this case, the housing 10 is directly attached to plate 12 and moves with said plate. Any angular difference between beam A and the housing would be indicated upon the indicating device 15. In this form the indicating device 15 will be operated directly from the output of the photoelectric cells 76 and 77. Obviously, the servo motor and all of its associated parts would be omitted. With respect to damping of the beam movements in the simplified modification, the flexible conduits 70 and 71 will be omitted, since it would be unnecessary to either apply or withdraw air from the damping cylinders. In such case damping would be controlled by the adjustment of the valves 69 in the air vent passages 68.

In both forms of the invention, the beam A is suspended in the same manner and the operation is the same as heretofore described. The only difference is that in the simplified form a measurement is made of the angle between the beam A and the housing, whereas in the preferred form the housing follows the beam and the measurement is between the housing and the base plate.

In some instances the use of the pump 88 and the conduits 70 and 71 may not be desirable and in Fig. 10 a slight modification of the dampers is shown. In this form the cylinders 67a of the dampers extend through openings 105 in the bottom of housing 10 and are secured to base plate 12. Obviously, damping is effected between the beam and the base plate and is controlled solely by the escape of air through the vent passages as controlled by the valve elements 69a. Otherwise, the operation is the same.

The important feature of the present invention is the manner of mounting the beam A and as heretofore described said beam may be employed as a reference which is responsive only to the direction of gravitational force or may be employed for measuring horizontal accelerations. It has also been found that a beam mounted in the manner of this invention is satisfactory for mounting a gyroscope and when so employed it satisfies the two main requirements of a gyro suspension. The low restoring force which is incorporated in the beam suspension together with the lack of a shift with time in the suspension makes the arrangement extremely satisfactory.

In Fig. 11 a beam B is illustrated as supporting a gyroscope G. The beam is preferably constructed of two parallel bars 106 having arms 122 and 123, comparable to the arms 22 and 23 of the beam A extending therefrom. The beam B is suspended in an identical manner except that the labilizing spring 52 is mounted off center of the beam extending downwardly through an opening 107 in the cross-arm 123. The gyro B is mounted vertically so as to make the system insensitive to rotations about a vertical axis. This is true because such rotations about a vertical axis will merely speed up or slow down the gyro by a relatively small amount. However, the system is extremely sensitive to rotation upon the longitudinal axis 11a. If the gyro is turning in the direction of the arrow in Fig. 11 and the near side S of axis 11 is raised and the far side S1 is lowered, then the lefthand end of the beam in Fig. 11 will descend, while the righthand end will rise a comparatively large amount as compared to the rotation on the axis 11a which produced such motion.

It is thus apparent that rotation on the transverse axis 11 can be employed to indicate very minute rotations about the axis 11a. The photoelectric and optical system arrangement heretofore described may be employed to indicate rotations on the axis 11 and this in turn is representative of rotations about the axis 11a. It would be possible to employ a servo motor controlled by the photoelectric cells to rotate the housing about the axis 11a and thus the housing would follow the desired movement which could be measured.

In order to measure or correct for rotations about the transverse axis 11, a second unit employing the gyro and disposed at substantially 90 degrees from the first system would be used. By mounting two of such systems on a single plate, the tilt of which would be controlled by the two servo systems, the surface of the plate would be maintained against rotation in space and could be employed as a stabilized platform.

Although the particular beam suspension as described herein has been found especially useful in employing the beam as a vertical reference or in connection with the measurement of horizontal accelerations and forces, said beam, suspended in the manner described, may be applicable to various uses, such as chemical balances, magnetometers and instruments for measuring the vertical gradients of gravity.

As previously noted, the suspension of the beam makes a long period of oscillation possible and thus the beam is responsive only to the direction of gravitational force and provides a vertical reference which can be used in any desired manner. The invention has been illustrated as measuring horizontal acceleration forces, but obviously can be employed in any environment where such vertical reference direction is required.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. An apparatus for providing a stabilized reference direction including, a support, an inertia member, means providing a substantially frictionless mounting for suspending said member from said support for rotation about a horizontal axis and for limited movement in any direction under impact including flexible tension means attached to the support and attached to the inertia member for suspending said member with respect to the support, said flexible tension means including resilient elements for applying a restoring torque to the member when said member oscillates about said horizontal axis, the points of attachment of the flexible tension means lying in substantially a straight line transversely of the inertia member with said line being substantially coincident with the center of gravity of said member, and means for counterbalancing the restoring torque applied by said flexible tension means to almost completely eliminate all torque acting between said support and said member in order to make the motion of said member respond almost solely to gravitational and acceleration forces.

2. An apparatus as set forth in claim 1, wherein the points of attachment of the flexible tension means to the inertia member are located in a straight line which is substantially in alignment with the axis of rotation.

3. An apparatus as set forth in claim 1, wherein the means for counterbalancing the restoring torque comprises a labilizing spring having one end secured to the support and its opposite end attached to the inertia member.

4. An apparatus as set forth in claim 1, together with a vertical gyroscope mounted upon the inertia member.

5. An apparatus for providing a stabilized reference direction including, a support, an inertia member, means providing a substantially frictionless mounting for suspending said member from said support for rotation about a horizontal axis and for limited movement in any direction under impact including flexible tension means attached to the support and attached to the inertia member for suspending said member with respect to the support, said flexible tension means including resilient elements for applying a restoring torque to the member when said member oscillates about the axis of rotation, means for substantially counterbalancing the restoring torque applied by said flexible tension means to almost substantially eliminate all torque acting between said support and said inertia member in order to make the motion of said inertia member respond almost solely to gravitational and acceleration forces, a balance weight attached to the inertia member for balancing the same with respect to its axis of rotation, and adjustable means for raising or lowering the center of gravity of the inertia member in a vertical direction.

6. An apparatus for providing a stabilized reference direction including, a support, an inertia member, means providing a substantially frictionless mounting for suspending said member from said support for rotation about a horizontal axis and for limited movement in any direction under impact including flexible tension means attached to the support and attached to the inertia member for suspending said member with respect to the support, said flexible tension means including resilient elements for applying a restoring torque to the member when said member oscillates about the axis of rotation, means for substantially counterbalancing the restoring torque applied by said flexible tension means to almost substantially eliminate all torque acting between said support and said inertia member in order to make the motion of said inertia member respond almost solely to gravitational and acceleration forces, and dampening means associated with said member for dampening the movement thereof.

7. An apparatus for providing a stabilized reference direction including, a support, an inertia beam, means providing a substantially frictionless mounting for suspending said beam from said support for rotation about a horizontal axis and for limited movement in any direction under impact including a plurality of flexible tension elements, each of said tension elements having one end attached to the support and the opposite end attached to the beam for suspending said beam from the support, each of said tension elements including a resilient element and being yieldable and capable of elongation under strain in a direction longitudinally of each element, said beam being acted upon by gravitational forces and being suspended in a normal position with all torques exerted on the beam by the tension elements balanced, and means for counterbalancing the restoring torque applied to the beam by the tension elements when the beam oscillates about its axis of rotation and moves from its normal position to almost completely eliminate all torque acting between the support and beam in order to make the motion of the beam respond almost solely to gravitational and acceleration forces.

8. An apparatus as set forth in claim 7, wherein the points of attachment of the flexible tension elements to the beam lie substantially in a straight line transversely of the beam with said line being substantially coincident with the center of gravity of said beam.

9. An apparatus as set forth in claim 7, together with a balance weight secured to the beam for balancing said beam.

10. An apparatus as set forth in claim 7, together with a balance weight secured to each end of the beam, and adjustable means for raising and lowering the center of gravity of the beam with respect to the support.

11. An apparatus as set forth in claim 7, together with damping means associated with the beam for damping the oscillating movement thereof.

12. An apparatus for providing a stabilized reference direction including, a support, an inertia beam, means providing a substantially frictionless mounting for suspending said beam from said support for rotation about a horizontal axis and for limited movement in any direction under impact including a plurality of flexible tension elements, each of said tension elements having one end attached to the support and the opposite end attached to the beam for suspending said beam from the support, each of said tension elements including a resilient element and being yieldable and capable of elongation under strain in a direction longitudinally of each element, said beam being acted upon by gravitational forces and being suspended in a normal position with all torques exerted on the beam by the tension elements balanced, and a labilizing spring having one end attached to the support and its opposite end attached to the beam for counterbalancing the restoring torque which is applied to the beam by certain flexible tension elements when the beam is moved from a normal position by oscillation about its axis of rotation to almost completely eliminate all torques acting between said support and said inertia member in order to make the motion of said inertia member respond almost solely to gravitational and acceleration forces.

13. A force measuring apparatus including, a base plate, a universally mounted pendulum having its upper end attached to the base plate to control the position of the base plate in accordance with the position of the pendulum, a housing mounted on the base plate, an inertia member within the housing and suspended for rotation about a horizontal axis, flexible tension means fixed to the housing and attached to the inertia member for suspending said member with respect to the housing, said flexible tension means applying a restoring torque to the member when said member oscillates about its axis of rotation, said inertia member being maintained in a direction controlled by gravitational force acting thereon, and means actuated by a relative movement of the housing with respect to the inertia member for sensing the position of the housing with respect to said member, whereby such sensing is representative of any movement of the pendulum as effected by accelerations or horizontal forces acting upon said pendulum.

14. A force measuring apparatus as set forth in claim 13, together with means extending between the housing and the inertia member for counterbalancing the restoring torque applied by said flexible tension means when the housing is moved with respect to the inertia member to cause said inertia member to oscillate about its axis of rotation.

15. A force measuring apparatus including, a housing having a support therein, an inertia member mounted upon said support for rotation about a horizontal axis and for limited movement in any direction under impact, flexible tension elements fixed to the support and attached to the inertia member for suspending said member with respect to the support, each flexible element being longitudinally yieldable under impact, said flexible tension elements applying a restoring torque to the member when said member oscillates about the axis of rotation, means for counterbalancing the restoring torque applied by said flexible tension elements, whereby said inertia member is acted upon substantially only by gravitational forces, means actuated by relative movement of the support with respect to the inertia member for sensing the position of the inertia member with respect to said support, and dampening means disposed between the inertia member and the housing for dampening the movement of the inertia member with respect to said housing.

16. A force measuring apparatus including, a base plate, a universally mounted pendulum having its upper end secured to the base plate whereby said plate is tilted in accordance with swinging movements of the pendulum as effected by horizontal accelerations or forces acting upon the pendulum, a housing mounted upon the base plate for tilting movement about a horizontal axis, an inertia member suspended within the housing and responsive substantially only to gravitational forces, a followup system including a servo motor having connection with the base and the housing, means responsive to movement of the housing with respect to the inertia member for actuating the servo motor to cause the housing to maintain a predetermined position with respect to the inertia member, and additional means also actuated by the movement of the housing with respect to the base for indicating the tilting movement of the housing with relation to the base plate, whereby such indication is representative of the angular displacement of the pendulum as effected by horizontal accelerations or forces acting upon the pendulum.

17. A force measuring apparatus as set forth in claim 16, together with a damping means disposed between the inertia member and the housing for damping the movement of the member with respect to said housing, a pump actuated by the servo motor of the followup system, and means for connecting said pump to the damping means whereby pressure fluid is applied to or withdrawn from the damping means to produce the desired damping effect in accordance with movements of the inertia member with relation to the base plate.

18. A force measuring apparatus as set forth in claim 16 wherein the inertia member is suspended within the housing for rotation about a horizontal axis by flexible tension elements each of which has one end secured to the housing and its other end attached to the support, said flexible tension elements applying a restoring torque to the member when said member oscillates with respect to the housing, and means for counterbalancing the restoring torque applied by said flexible tension elements when the inertia member is oscillated.

19. An apparatus for providing a stabilized reference direction including, a support, an inertia member, supporting wires extending from opposite side of the inertia member along a balancing axis of the inertia member and attached to resilient means carried by the support, a plurality of resilient tension means fixed to the support and attached to the inertia member substantially at the balancing axis of the member, said tension means applying a restoring torque to the member when said member oscillates about said axis, and means for substantially counterbalancing the restoring torque applied by the tension means.

20. An apparatus as set forth in claim 19, wherein the balancing axis passes substantially through the center of gravity of the inertia member.

21. A force measuring apparatus including, a support, a pair of units mounted in fixed position on the support, each unit including an inertia member suspended within a housing and responsive to the direction of gravitational force, and mounted for oscillation about an axis of rotation in substantially a horizontal plane, the axis of rotation of one member being disposed at a right angle to the axis of rotation of the other member, and means responsive to movement of the support with respect to either inertia member for maintaining the support in a predetermined position with respect to said inertia members.

22. An apparatus for providing a stabilized reference direction including, a support, an inertia member, flexible tension means including resilient elements extending between said support and said inertia member to suspend said inertia member from said support, said flexible tension means being attached to said inertia member in a substantially horizontal line to permit oscillation of said inertia member about said horizontal line as an axis of rotation, all of said tension means being longitudinally yieldable under impact, said tension means applying a restoring torque to said inertia member when said member oscillates about said axis of rotation, resilient means extending between said support and said inertia member for counterbalancing said restoring torque and almost completely eliminating all torque acting between said support and said inertia member in order to make the motion of said inertia member respond almost solely to gravitational and acceleration forces, the center of gravity of said inertia member being substantially in said axis of rotation to produce a long natural period of oscillation of said inertia member and thereby make said inertia member insensitive to horizontal accelerations of shorter periods thereby making said inertia member a stabilized reference.

23. A force measuring apparatus including, a support, a pair of units mounted in fixed position on the support, each unit including an inertia member suspended within a housing and responsive to the direction of gravitational force, and mounted for oscillation about an axis of rotation in substantially a horizontal plane, the axis of rotation of one member being disposed at a substantial angle to the axis of rotation of the other member, and means responsive to movement of the support with respect to either inertia member for maintaining the support in a predetermined position with respect to said inertia members.

References Cited in the file of this patent

UNITED STATES PATENTS

| | | |
|---|---|---|
| 1,870,344 | Neumann | Aug. 9, 1932 |
| 2,327,697 | Boucher | Aug. 24, 1943 |
| 2,589,710 | La Coste | Mar. 18, 1952 |
| 2,634,610 | Silverman | Apr. 14, 1953 |
| 2,660,062 | Frowe | Nov. 24, 1953 |
| 2,674,885 | Silverman | Apr. 13, 1954 |